(12) United States Patent
Chriqui et al.

(10) Patent No.: US 10,545,289 B1
(45) Date of Patent: Jan. 28, 2020

(54) PLANAR OPTICAL HEAD FOR FREE SPACE OPTICAL COMMUNICATIONS, COHERENT LIDAR, AND OTHER APPLICATIONS

(71) Applicant: LOCKHEED MARTIN CORPORATION, Bethesda, MD (US)

(72) Inventors: Guy Chriqui, San Mateo, CA (US); Chad Elliott Ogden, Half Moon Bay, CA (US); Paul J. Suni, Berthoud, CO (US); Kevin R. Bock, San Jose, CA (US); Gregory S. Feller, Kentfield, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/242,961

(22) Filed: Jan. 8, 2019

Related U.S. Application Data

(60) Provisional application No. 62/716,288, filed on Aug. 8, 2018.

(51) Int. Cl.
*G02B 6/26* (2006.01)
*G02B 6/34* (2006.01)
*G02F 1/31* (2006.01)
*G02B 26/08* (2006.01)

(52) U.S. Cl.
CPC ................ *G02B 6/26* (2013.01); *G02B 6/34* (2013.01); *G02B 26/0833* (2013.01); *G02F 1/31* (2013.01)

(58) Field of Classification Search
None
See application file for complete search history.

(56) References Cited

U.S. PATENT DOCUMENTS

2017/0299697 A1* 10/2017 Swanson .............. A61B 5/0066

* cited by examiner

*Primary Examiner* — Chad H Smith
(74) *Attorney, Agent, or Firm* — Morgan, Lewis & Bockius LLP (57) ABSTRACT

A multi-aperture optical system includes a photonic integrated circuit, a spacer substrate coupled to the photonic integrated circuit, a plurality of optical cells, a beam combiner, and a photodetector coupled to the beam combiner. The photonic integrated circuit, the spacer substrate, the plurality of optical cells, the beam combiner, and the photodetector are integrated as a single monolithically formed optical head. Each optical cell includes a focusing optical element formed on the spacer substrate and configured to focus the light through the substrate and onto a folding element. The folding element is integrated into the photonic integrated circuit to couple light incident on the optical cell into a waveguide. The waveguide is coupled to the phase shifter to transport the light reflected by the folding element through a phase shifter. The phase shifter is coupled to the focusing optical element to shift a phase of an optical signal received by the focusing optical element.

23 Claims, 7 Drawing Sheets

PLANAR OPTICAL HEAD FOR FREE SPACE OPTICAL COMMUNICATIONS, COHERENT LIDAR, AND OTHER APPLICATIONS

CROSS-REFERENCE TO RELATED APPLICATIONS

This application claims priority under 35 U.S.C. § 119 to Provisional Application No. 62/716,288 filed on Aug. 8, 2018, in the United States Patent and Trademark Office.

STATEMENT REGARDING FEDERALLY SPONSORED RESEARCH OR DEVELOPMENT

Not Applicable.

TECHNICAL FIELD

The present description relates in general to coherent free space optical communications (FSOC) and remote sensing coherent LIDAR, and more particularly to, for example, without limitation, a monolithically or nearly monolithically formed multi-aperture optical system ("optical head") for high speed FSOC and coherent LIDAR.

BACKGROUND

A primary use of the subject technology is free space optical communications (FSOC) and the descriptions will primarily relate to this application. However, the technology can also be applied to coherent LIDAR as well as to other optical system types, such as optical illuminators or designators.

FSOC systems can enable high-speed wireless communications over a sizable range (e.g., many kilometers). In terrestrial applications, such systems can achieve very high (e.g., more than 10 gigabits per second-Gbps) data rates. Multiplexing several (N) optical frequencies in a single system enables the data rate of the system to be multiplied by N.

Unlike communications over fiber-optic transmission lines, FSOC must deal with atmospheric turbulence. This can significantly degrade performance by creating optical phase variations across the optical aperture used to transmit and receive light. Conventional FSOC systems have a single optical aperture ("monostatic" configuration) or may have separate transmit and receive apertures ("bistatic" configuration) through which light is transmitted and received. When turbulence effects are substantial enough that the transverse scale of the phase fluctuations (typically measured by the so-called Fried parameter $r_0$) become comparable to or smaller than the aperture diameter D then the system performance begins to degrade, resulting in signal fluctuations (fades) and/or data drop-outs. Conventional FSOC systems also typically need mechanical beam steering assemblies for coarse beam pointing as well as to mitigate pointing errors due to, for example, jitter of the platform to which it is attached. These mechanical assemblies add considerable weight, are frequently bulky, and often consume high electrical power.

The description provided in the background section should not be assumed to be prior art merely because it is mentioned in or associated with the background section. The background section may include information that describes one or more aspects of the subject technology.

SUMMARY

In one or more implementations, a multi-aperture optical system is provided that includes a photonic integrated circuit, a spacer substrate coupled to the photonic integrated circuit, a plurality of optical cells, a beam combiner, and a photodetector coupled to the beam combiner. The photonic integrated circuit, the spacer substrate, the plurality of optical cells, the beam combiner, and the photodetector are integrated as a single monolithically formed optical head. Each optical cell includes a focusing optical element formed on the spacer substrate and configured to focus the light through the photonic integrated circuit and onto a folding element. The folding element is integrated into the photonic integrated circuit to couple light incident on the optical cell into a waveguide. The waveguide is integrated into the photonic integrated circuit and coupled to the phase shifter to transport the light reflected by the folding element through a phase shifter. The phase shifter is coupled to the focusing optical element to shift a phase of an optical signal received by the focusing optical element. The beam combiner is coupled to the phase shifters to combine light output from the phase shifters. The photodetector receives the combined light output from the beam combiner and outputs a corresponding signal.

In one or more implementations, a method of manufacturing a multi-aperture optical system is provided that includes fabricating a plurality of optical cells on the photonic integrated circuit, where each optical cell includes a folding element, a focusing optical element, a phase shifter, and a waveguide coupled to the phase shifter. The fabricating includes, for each optical cell, integrating a folding element into the photonic integrated circuit, embedding the phase shifter in the photonic integrated circuit, fabricating the waveguide on the photonic integrated circuit, coupling the waveguide to the phase shifter, and fabricating the focusing optical element on a spacer substrate coupled to the photonic integrated circuit above the folding element. The method further includes fabricating a beam combiner and a photodetector on the photonic integrated circuit, and coupling a controller to the photodetector to control phase shifts of each phase shifter based on a signal output from the photodetector. The photodetector is coupled to the beam combiner and the beam combiner coupled to each phase shifter. The photonic integrated circuit, the spacer substrate, the plurality of optical cells, the beam combiner, the photodetector, and the controller are monolithically formed as a single photonic integrated circuit.

It is to be understood that both the foregoing general description and the following detailed description are exemplary and explanatory and are intended to provide further explanation of the subject technology as claimed. It is also to be understood that other aspects may be utilized, and changes may be made without departing from the scope of the subject technology.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In an effort to address the deficiencies associated with the conventional FSOC systems described above, alternative FSOC systems have been proposed, such as that described in U.S. patent application Ser. No. 15/217,833. The alternative FSOC systems described in U.S. patent application Ser. No. 15/217,833 replace the single aperture of the conventional FSOC systems with multiple smaller apertures ("sub-apertures"). By making the sub-apertures smaller than the anticipated worst-case Fried parameter each sub-aperture sees a linear phase across it. By incorporating optical phase shifters in each sub-aperture "channel" and a means to measure phase variations it is possible to counter the phase variability across the set of sub-apertures and reduce or eliminate turbulence impact.

The alternative FSOC systems described in U.S. patent application Ser. No. 15/217,833 includes an array of lenslets for transmitting or receiving light. Each lenslet is optically coupled to a single-mode optical fiber. A drawback associated with optical fibers is that they are susceptible to environmental effect, including pathlength changes due to mechanical and thermal disturbances. Unless the thermal and mechanical environment is controlled carefully these pathlength changes may add to the problem of controlling phases across the channels. Furthermore, coupling light from free space into single-mode fibers necessitates high alignment precision, which can make large arrays costly to fabricate.

Various aspects of the present disclosure are directed to addressing the deficiencies of the alternative FSOC systems described in U.S. patent application Ser. No. 15/217,833 and the conventional single aperture architectures by constructing a substantially monolithic optical system (head) that does not require a multitude of discrete optical components and complex construction techniques. The various embodiments of the present disclosure described herein enable construction of systems far smaller and lightweight than is possible prior architectures. The system can furthermore incorporate non-mechanical beam steering to enable continuous beam steering, or pointing, over large angular ranges, such as +/−45 degrees or more.

Various aspects of the present disclosure described herein are directed to an optical phased array assembly (OPAA) and a beam steering assembly (BSA). In some embodiments, the OPAA is a multi-aperture optical system (head) that may include a photonic integrated circuit (PIC), a spacer substrate, and an array of optical cells. The PIC incorporates waveguides for transporting light, light beam folding elements, optical phase shifters, a beam combiner, and may incorporate a beam splitter. The PIC may also incorporate a photodetector coupled to the beam combiner. However, the various embodiments described herein are not limited to the aforementioned configuration. Alternatively, in other embodiments the photodetector may be positioned external to the PIC, in which case light may be coupled to it using, for example, an optical fiber. Similarly, the PIC may contain a laser for transmitting light through the structure and into free space or the laser may also be positioned external to the PIC and an optical fiber used to couple light into the PIC. The PIC may also incorporate an optical amplifier, for example, a semiconductor optical amplifier (SOA). A controller may also be connected electrically to the photodetector and used to control the optical phase shifters based on the detected photodetector signal. As shall be described in further detail below, the substrate, the PIC, and the lensing elements may be constructed as a single monolithic assembly.

In accordance with some embodiments, the OPAA as described above may be optically coupled to one or more beam steering devices to enable beam steering over much greater ranges than is possible with just the OPAA. The beam steering device may be a mechanical mirror assembly, or it could alternatively be a non-mechanical beam steerer. As an example, a polarization grating liquid crystal (PGLC) beam steerer could be used to steer in discrete steps. For example, such a device could steer over +/−45 degrees or more with a step size of 1 degree. In cases where the PGLC step angle is greater than the OPAA steering angle a third steering mechanism could be inserted between the OPAA and the PGLC. This enables continuous steering from small angles to large angles. Such a third steering mechanism could be, for example, a mechanical mirror or it could be a liquid crystal OPA or a liquid crystal spatial light modulator (SLM).

The monolithically formed multi-aperture optical system is designed to enable minimization of the adverse effects of atmospheric turbulence which can significantly degrade performance of the system, as described above. In addition, the optical phased array nature of the system allows for fine angle beam steering. In particular, the planar FSOC optical head of the various embodiments described herein combines a monolithically formed OPAA with solid state, wide-angle beam steering which reduces the complexity of the mechanical structure as compared with conventional FSOC optical heads.

The multi-aperture optical system of the various embodiments described herein allows for many improvements across the FSOC portfolio. For example, the alternative FSOC systems described in U.S. patent application Ser. No.

15/217,833 are generally configured with a plurality of sub-apertures which use discrete lenses to focus light onto corresponding single-mode fibers, whereby each of the optical fibers needs to be separately and precisely aligned with and coupled to corresponding phase shifters. In these embodiments, the optical fibers are used as waveguides to couple each of the sub-apertures to the phase shifters, and to guide light from the sub-apertures to the phase shifters. This configuration is disadvantageous in that optical fibers are traditionally extremely sensitive to thermal and mechanical disturbances. This type of optical head is generally complex to construct and requires greater control to minimize the impact of disturbances.

In contrast, a multi-aperture optical system whose components are fabricated in a substantially monolithic form, as described herein, eliminates the need for incorporating optical fibers to couple the focusing optical elements to phase shifters in order to perform the phase correction. Further, the monolithic nature of the described systems allows for more complexity in a single substrate and results in a solid-state system that is more jitter resistant and geometrically conformal than conventional FSOC systems.

Additionally, since the multi-aperture optical system of the various embodiments described herein is entirely solid state, unlike conventional FSOC systems, mechanical actuators are not necessary to perform the phase correction. Therefore, the disclosed multi-aperture optical systems can run at a significantly higher bandwidth and may be substantially more robust as compared with conventional FSOC systems. Further, the multi-aperture optical system of the various embodiments described herein is substantially smaller and lighter and offers substantial size, weight, and power (SWaP), as well as cost saving features over conventional configurations. For example, for a fixed light collection area, the disclosed multi-aperture optical system has a fraction of a depth of the traditional FSOC systems, thereby resulting in a substantial volume and weight savings, e.g., by an order of magnitude or more. Moreover, the entire disclosed beam combiner can be integrated into the PIC.

Furthermore, contrary to the alternative FSOC systems described in U.S. patent application Ser. No. 15/217,833 in which high precision alignment of the individual components of the system (e.g., alignment of the phased array) needs to be carried out, the multi-aperture optical system of the various embodiments described herein may be fabricated using lithographically defined chips which may eliminate the need for performing high precision alignment of individual components. Thus, the assembly/manufacturing process of the multi-aperture optical system of the various embodiments described herein is significantly easier and can be done reliably and repeatedly without spending extensive expert labor hours. Additionally, since potential complexity occurring during assembly are kept at the lithographically manufactured stage, labor costs, issues with reliability, and other similar problems associated with conventional or alternative FSOC assembly/manufacturing processes are substantially reduced. Further advantageously, cost may be reduced as high volume multi-aperture optical systems can be fabricated at low cost using existing chip foundries.

Figure 1:
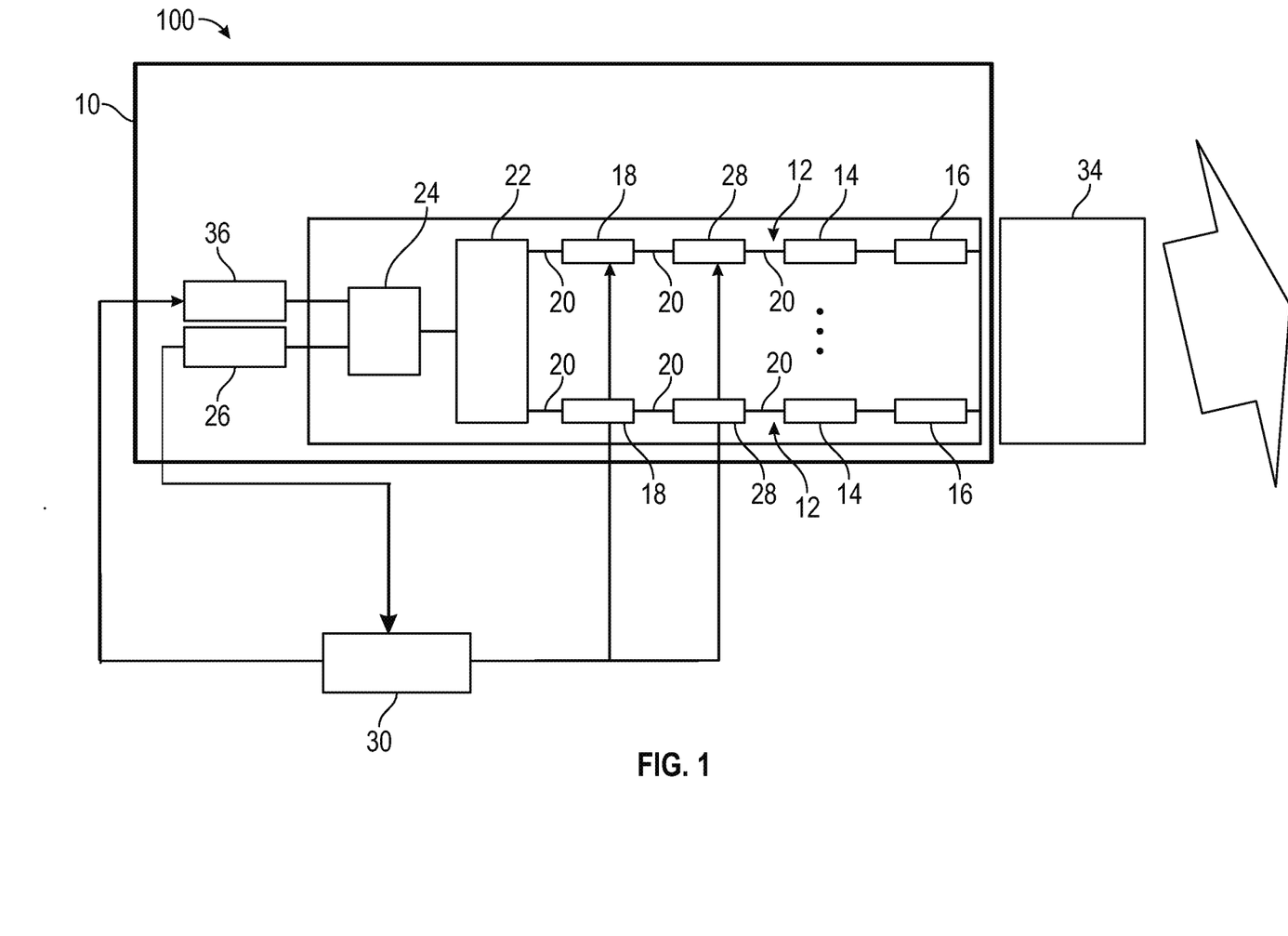
FIG. 1 is a block diagram illustrating a multi-aperture optical system for free-space optical communication (FSOC), according to some embodiments of the present disclosure.

FIG. 1 is a block diagram illustrating a multi-aperture optical system for free-space optical communication (FSOC), according to some embodiments of the present disclosure. As depicted, the multi-aperture optical system 100 includes a PIC 10, a spacer substrate 32 (illustrated in FIG. 2), and a plurality of optical cells 12 monolithically formed with the PIC 10. In accordance with some embodiments, a plurality of multi-aperture optical systems 100 may optically communicate with one another through open space. To this effect, each multi-aperture optical system 100 may be coupled to an FSO modem (not shown), which in turn is in communication with a network (not shown) via, for example, a network switch (not shown). Examples of the network include the Internet, a local area network (LAN), an Ethernet network, or other networks). In some embodiments, each multi-aperture optical system 100 receives optical signals from the FSO modem and transmits electrical signals to the FSO modem. Communications between the FSO modem and the switch and between the switch and the network is through electrical signals. In this manner, each multi-aperture optical system 100 is able to correct the phase of the received signal to compensate for atmospheric disturbance.

In some embodiments, each cell includes a focusing optical element 16 formed on the spacer substrate 32 (illustrated in FIGS. 2 and 3), a phase shifter 18, and a waveguide 20, all monolithically integrated onto the PIC 10. The focusing optical element 16 may be configured to receive light and focus the light through the PIC 10 and onto the folding element 14. The phase shifter 18 may be embedded in the PIC, and the waveguide 20 may be coupled to the phase shifter 18 to transport the light through the phase shifter 18. As depicted, the multi-aperture optical system may further include a beam combiner 22 coupled to the phase shifters 18, and configured to combine light output from the phase shifters 18. A photodetector 26 may be coupled to the beam combiner 22 to receive the combined light output from the beam combiner 22 and output a corresponding signal. In some embodiments, the multi-aperture optical system 100 may optionally include a beam splitter for splitting the signal output from the beam combiner 22 into first and second portions. As further depicted, the multi-aperture optical system 100 may further include a controller 30 coupled or otherwise connected to the photodetector 26 and each of the phase shifters 18 to control phase shifting of each phase shifter 18 based on the signal output from the photodetector 26. In some embodiments, the controller may be a general-purpose microprocessor, a microcontroller, a digital signal processor (DSP), an application specific integrated circuit (ASIC), a field programmable gate array (FPGA), a programmable logic device (PLD), a state machine, gated logic, discrete hardware components, or any other suitable device that can perform calculations or other manipulations of information As shall be described in further detail below, the PIC 10, the spacer substrate 32, the plurality of optical cells 12, the beam combiner 22, and the photodetector 26 may be integrated as a single monolithically formed optical head. In particular, in some embodiments, the folding elements 14, the phase shifters 18, the waveguides 20, the optional amplifier 28, the beam combiner 22, and the photodetector 26 may be lithographically formed on the PIC as a single monolithic unit. A laser input port 36 may further be provided for coupling an optical source such as a laser (not shown herein for simplicity), or an on-chip laser may be used.

In accordance with various embodiments of the present disclosure, the multi-aperture optical system 100 may be operated in either receiving or transmitting modes. In receiving mode light is captured by each optical cell 12, and focused by the focusing optical element 16 onto the folding element 14. The folding element 14 may redirect the light at substantially 90 degrees to fold it into the PIC 10. Light may then be transported by the waveguides 20 through the phase shifter 18 and, if present, through the amplifier 28, and then to the beam combiner 22. In some embodiments, the relative positions of the phase shifter 18 and the amplifier 28 may be reversed. In transmission mode light may propagate in the opposite direction from the beam combiner 22 to the focusing optical element 16 and into free space. The beam combiner 22 may coherently combine the light from all optical cells 12 and couple the combined light to the photodetector 26 which may then output a corresponding signal. In operation, the controller 30 may be coupled or connected to the photodetector 26 and to the phase shifters 18 to control the phase of each phase shifter 18 based on the signal output from the photodetector 26. In particular, in some embodiments, the controller may execute various instructions in the form of algorithms to maximize the signal output by the photodetector, or may be used to impose specific phase shifts in each optical cell 12. For example, in some embodiments, the controller may be used to impose linear phase shifts across the array of optical cells 12 to effect optical phased array (OPA) beam steering over an angular range A, whose magnitude may be proportional to the transverse dimension of the optical beam at each sub-aperture. In some embodiments, smaller beams provide larger OPA angular range and vice versa.

Figure 2:
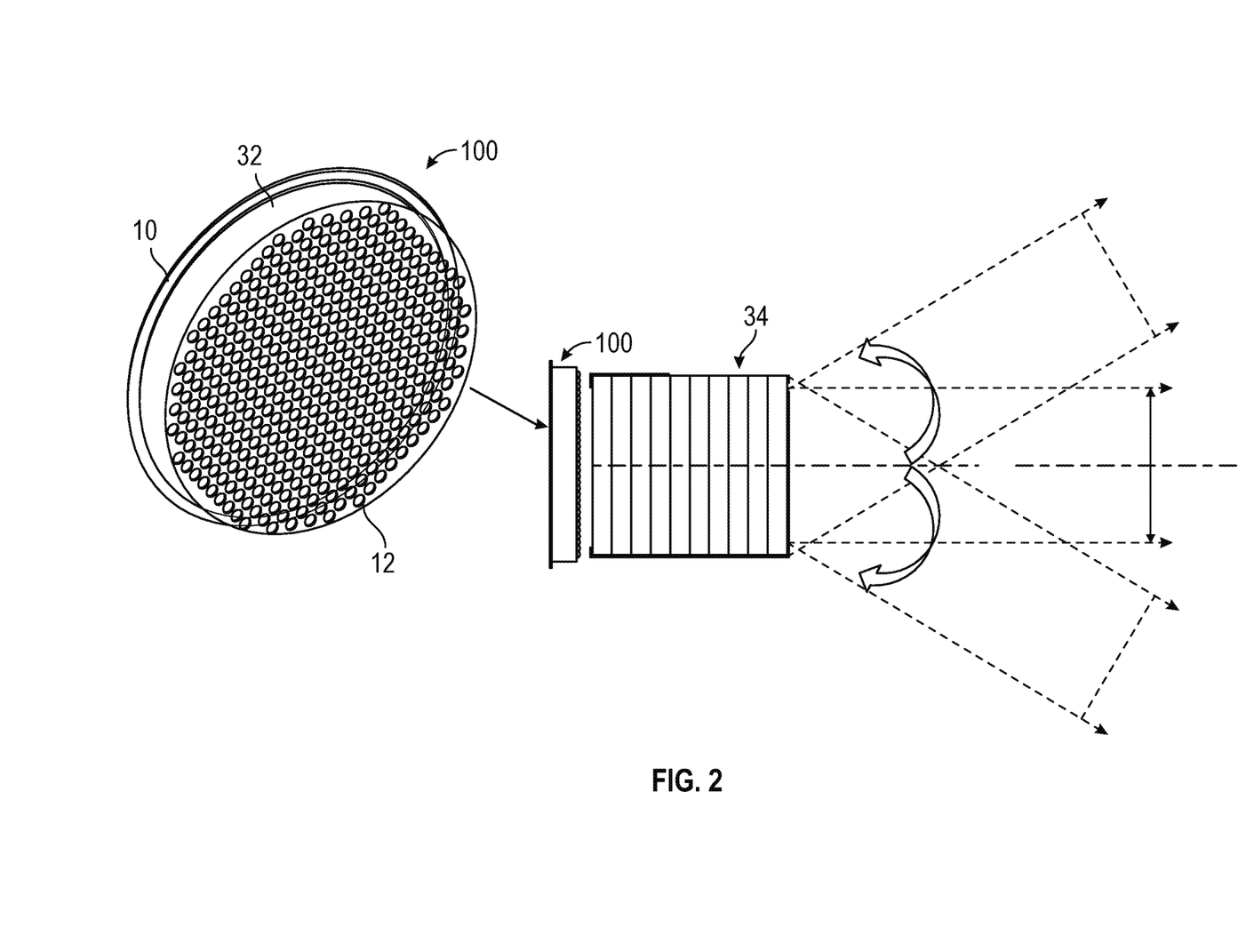
FIG. 2 is a perspective view illustrating the multi-aperture optical system of FIG. 1, according to some embodiments of the present disclosure.

FIG. 2 is a perspective view illustrating the multi-aperture optical system of FIG. 1, according to some embodiments of the present disclosure. As depicted in FIGS. 1 and 2, the multi-aperture optical system 100 may further include a coarse beam steering element 34 positioned in front of, or depending on orientation, directly above the plurality of optical cells 12. The coarse beam steering element 34 may be a non-mechanically steered beam steering device, or a mechanically steered beam steering device. In some embodiments, the non-mechanically steered beam steering device may be a liquid crystal beam steering device including a plurality of liquid crystal polarization gratings (LCPGs). The LCPGs may, for example be thin birefringent films that steer light to one of two deflection angles, depending on the polarization of the input light. Advantageously, the plurality of LCPGs may be stacked against each other to create a wide-angle non-mechanical beam control system with significant improvements over mechanically steered systems in size, weight, and power (SWaP), beam agility, and pointing stability. In operation, the LCPGs use polarization modulation instead of phase or amplitude modulation (as done with traditional diffraction gratings), resulting in increased first-order efficiencies, for example, exceeding 99.8%. Beams are diffracted into a positive or a negative order with a pass-through zero (undeflected) order possible. Because each LCPG of the plurality of LCPGs can be switched, deflection angles can be added or subtracted as light propagates through the plurality of LCPGs. A relatively small number of LCPGs can provide a large set of deflection angles, enabling a wide range of angles in two dimensions to be achieved with a small number of LCPGs. The high efficiency and compact size advantageously yields a multi-aperture optical system 100 having size and weight savings. In some embodiments, the mechanically steered beam steering device may be a mechanically steered mirror, e.g., a mechanical mirror-based gimbal or a mirror steered by a galvanometer mechanism, or any other form of Microelectromechanical systems (MEMS).

Figure 3:
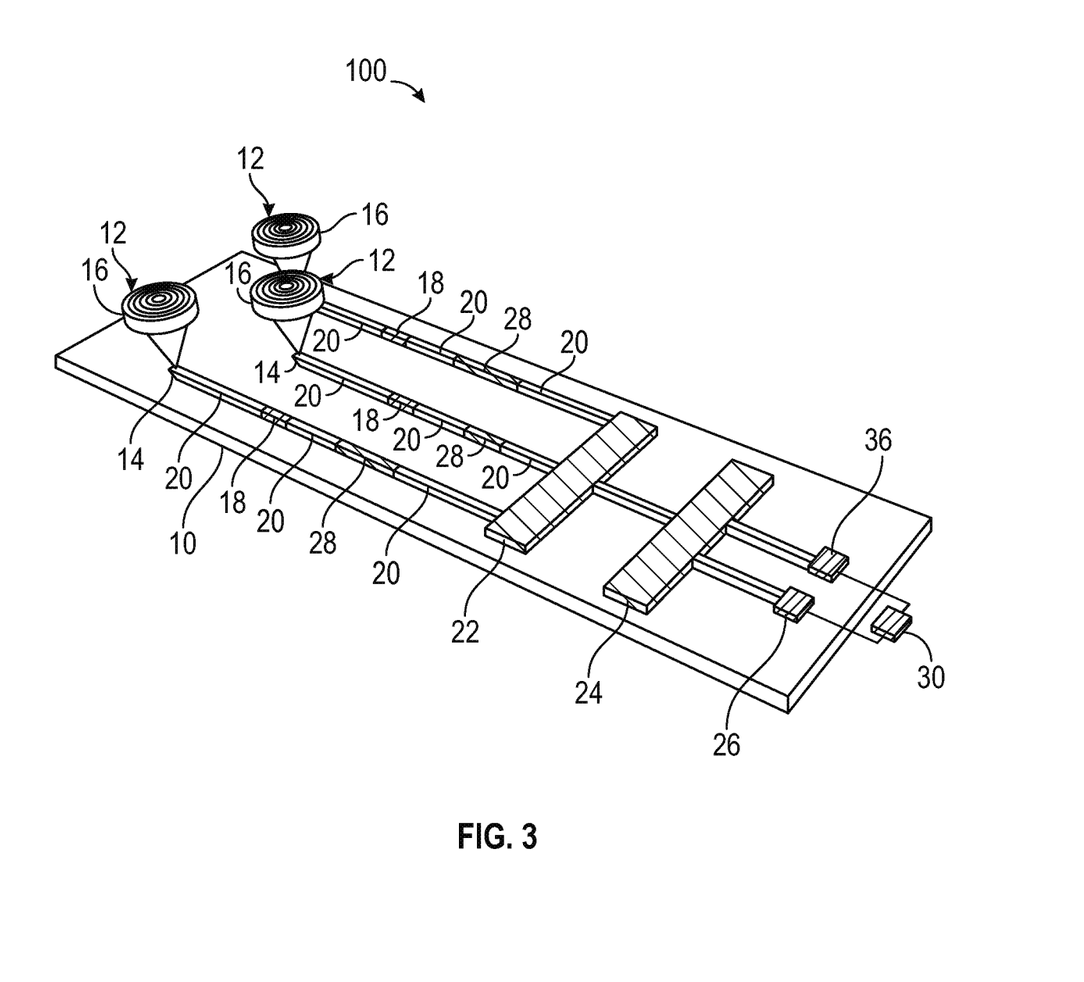
FIG. 3 is a perspective view illustrating a configuration of three optical cells of the multi-aperture optical system of FIG. 2, according to some embodiments of the present disclosure.

FIG. 3 is a perspective view illustrating a configuration of three optical cells 12 of the multi-aperture optical system 100 of FIG. 2, according to some embodiments of the present disclosure. As depicted in FIG. 3, with continued reference to FIG. 1, the plurality of optical cells 12, the beam combiner 22, and the photodetector 26 may be integrated as a single monolithically formed optical head. To this effect, the folding elements 14, phase shifters 18, and waveguides 20 of each of the optical cells 12 may be lithographically fabricated or grown onto the PIC 10, and coupled to the beam combiner 22, and the photodetector 26—each of which may be fabricated directly on the PIC 10. Each folding element 14 may be integrated into the PIC 10, and optically coupled with the respective waveguide 20. Each optical waveguide 20 may be fabricated on the PIC 10 and coupled to the corresponding phase shifter 18 which may be embedded in the PIC 10. Each focusing optical element 16 may be fabricated or grown onto the spacer substrate 32, which is coupled to the PIC above the corresponding folding element 14. For example, the focusing optical elements 16 may be lithographically formed on the spacer substrate 32 (illustrated in FIGS. 5A-5C) as a layer above the folding elements 14.

In some embodiments, the monolithically formed multi-aperture optical system 100 is a compact assembly, for example, with a depth, D, of less than 1 cm, as compared to the aperture of conventional FSOC systems that may have a depth of about 50 cm.

In operation, each phase shifter 18 imposes a phase shift on an optical signal received by the corresponding focusing optical element 16. In accordance with some embodiments, each phase shifter 18 may be an electro-optical (EO) phase shifter such as a lithium niobate crystal shifter. In other embodiments, each phase shifter 18 may be another type of phase shifter, such as a thermal phase shifter or a phase shifter fabricated using silicon (Si) or other materials, including indium phosphide (InP). Each phase shifter 18 may receive a control signal (e.g., a phase command signal) from the controller 30, and shift a phase of a respective input optical signal received from a respective focusing element 16 based on the control signal.

In some embodiments, the phase-shifted optical signals from each of the phase shifters 18 are coherently combined by the beam combiner 22 and output to the photodetector 26. The processing of the phase of a respective optical signal input to each phase shifter 18 results in correcting the phase of the respective input optical signal to remove adverse effects of atmospheric turbulence on the optical signal. The atmospheric turbulence disturbs, for example, the phase of the optical signal while traveling in open space. The processed phase of a respective optical signal input to each phase shifter 18 may also be used to steer the beam over small angles.

In accordance with some embodiments, the controller 30 receives the output signal from the photodetector 26, and generates control signals that are used by the phase shifters 18 to shift the phase of each respective input optical signal received from the respective focusing optical elements 16, based on the control signal. In some embodiments the control signals to the phase shifters may be dithered in order to maximize the photo-detector signal, indicating the contributions from all subapertures are mutually coherent. Additional phase shifts may be applied to the individual channels, for example to impose linear phase gradients across the full aperture.

Figure 4:
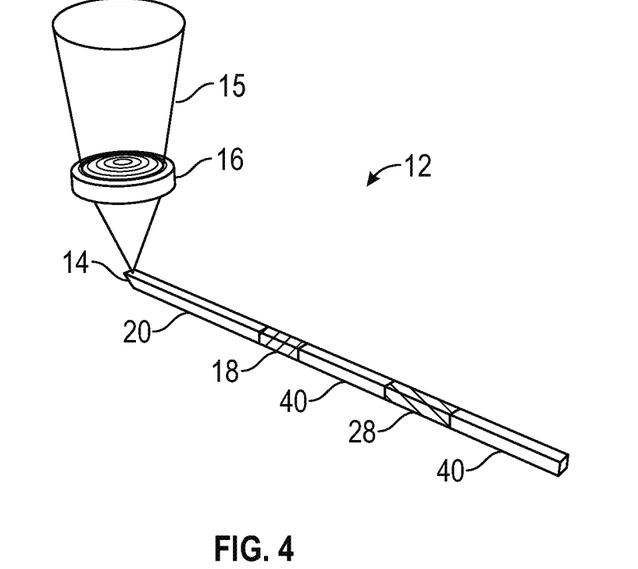
FIG. 4 is a perspective view illustrating light incident on one of the optical cells of the multi-aperture optical system of FIG. 2, according to some embodiments of the present disclosure.

FIG. 4 is a perspective view illustrating light incident on one of the optical cells of the multi-aperture optical system of FIG. 2, according to some embodiments of the present disclosure. As briefly described above, each optical cell 12 may include a focusing optical element 16, a folding element 14, a phase shifter 18, and a waveguide 20, all monolithically integrated onto the PIC 10. As depicted, each focusing optical element 16 may be configured to receive an incident beam of light 15 and to focus the light 15 through the PIC 10, and onto the folding element 14. As such, each of the focusing optical elements 16 may be a micro-lens, a lithographically defined lens, a gradient-index lens, a holographically formed lens, a refractive lens, or diffractive optics. In some embodiments, however, the focusing optical elements 16 may be meta materials lenses, thereby providing the advantage of reduced reliance on traditional lenslets. Since the meta materials lenses are printed directly onto the substrate surface they advantageously provide a thinner and more compact configuration as compared with traditional lenslets. Further advantageously, the meta materials lenses may be printed onto the substrate using a lithographic process, thereby eliminating the need for labor-intensive alignment commonly used with traditional lenslets.

Each focusing optical element 16 is aligned to a corresponding waveguide 20 (e.g., via the spacer substrate 32 (illustrated in FIGS. 5A-5C)) to maintain a fixed relative position thereto. To this effect, a method of manufacture may include fusing each focusing optical element 16 to the spacer substrate 32, and optically coupling each focusing optical element to the corresponding waveguide 20 on the PIC 10 to form a monolithic structure. As previously discussed, each focusing optical element 16 may be fabricated or grown onto the spacer substrate 32 above the corresponding folding element 14. For example, the focusing optical elements 16 may be lithographically formed on the spacer substrate 32 as a layer above the folding elements 14 and on top of the PIC 10. In some embodiments, the focusing optical elements 16 can be positioned within a common plane. Each focusing optical element 16 may be formed with a common focal length and a distance from each of the focusing optical elements 16 to the substrate may be equal.

The focusing optical element 16 of the various embodiments described herein may advantageously be more compact in size as compared to focusing elements or apertures of conventional FSOC systems. In particular, the focusing element 16 may have a diameter raging from about 10 µm to about 10 mm, as compared to focusing elements of prior art systems which typically have diameters of 50 mm or greater. Advantageously, the compact size of the focusing elements described herein allows for a greater number of focusing elements 16 to be monolithically formed on the spacer substrate. A greater number of focusing elements yields a corresponding increase in the number of channels through which light may propagate through the multi-aperture optical system. For example, the multi-aperture optical system 100 of the various embodiments described herein may incorporate 256 or more focusing elements 16 based on the compact size of the focusing elements, as compared to prior art systems having larger focusing elements/apertures. Additionally, due to the increased number of focusing elements, the multi-aperture optical system 100 of the various embodiments described herein may be capable of compensating for more severe turbulence and may be more fade resistant with respect to the optical signal as compared to conventional FSOC systems.

In some embodiments, each folding element 14 is a boundary surface (e.g., a mirror or grating coupler) defined in the PIC 10, and configured to receive and reflect the incident beam of light 15 within the PIC 10. For example, each folding element 14 can reflect light transmitted from a corresponding focusing optical element 16 to a corresponding waveguide 20. By further example, where the waveguides 20 is oriented in a direction that is orthogonal to an orientation of the focusing optical element 16, the folding element 14 can be formed at an angle of 45θ within the PIC 10 in order to reflect the light at a right angle. Thus, the reflected beam may exit the folding element 14 at a 90° angle with respect to the incident light beam. It will be recognized that other angles can be used to reflect light transmitted from each of the focusing optical elements 16 to the corresponding waveguides 20. Accordingly, the folding elements 14 can act as prisms to direct light from the focusing optical elements 16 to the corresponding waveguides 20 which may be oriented in a transverse (e.g., orthogonal) direction with respect to the direction of incident light. Advantageously, this enables construction of a flat, thin monolithic FSOC system, in the form of a PIC device, with the focusing optical elements 16 overlaying the rest of the elements/components of the multi-aperture optical system 100.

In some embodiments, each waveguide 20 is coupled to a phase shifter 18, and configured to transport the light reflected by the folding element 14 through the corresponding phase shifter 18. The alternative FSOC systems described in U.S. patent application Ser. No. 15/217,833 employ waveguides in the form of optical fibers, however as discussed above, the multi-aperture optical system of the various embodiments described herein obviates the need to use optical fibers to couple the focusing element to the phase shifters. In some embodiments, the waveguide 20 is lithographically formed on the PIC 10. Alternatively, the waveguide 20 may be fabricated on the PIC 10 using ultrafast laser inscription (ULI). Thus, the waveguide 20 may be fabricated directly on the PIC 10 in the desired position, as opposed to the alternative FSOC systems described in U.S. patent application Ser. No. 15/217,833, in which the waveguide is in the form of optical fibers which need to be individually aligned precisely. Accordingly, the aforementioned configuration yields a monolithic, pre-aligned (based on location of fiducial indicators) multi-aperture optical system which eliminates the tedious process of manual alignment of separate focusing optical elements and optical fiber waveguides. Further, the aforementioned configuration provides a product with improved thermal stability and jitter resistance, as compared to conventional FSOC systems. The alternative FSOC systems described in U.S. patent application Ser. No. 15/217,833 employ a mechanical array of lenslets coupled into single-mode optical fiber, thereby necessitating meticulous single micron alignment of separate focusing optical elements and optical fiber waveguides. In contrast, the multi-aperture optical system of the various embodiments described herein may be fabricated using lithographically defined chips, thereby eliminating the need for high precision alignment of the individual components and drastically reducing manufacturing costs.

In some embodiments, each phase shifter 18 processes a phase of an optical signal received by the corresponding focusing optical element 16. Each phase shifter 18 may receive a control signal (e.g., a phase command signal) from the controller 30, and process (e.g., shift) the phase of a respective input optical signal received from a respective focusing element 16 based on the control signal. In accordance with some embodiments, each phase shifter 18 may be a thermal phase shifter, a semiconductor phase shifter, or an electro-optic phase shifter.

Each optical cell 12 may further include an optical amplifier 28 disposed in series with the phase shifter 18. Due to insertion losses in the optical components fabricated on the PIC 10, particularly at points of their coupling, the optical amplifier 28 may be included in each optical path to boost output channel signals from the respective phase shifter 18. The optical amplifier 28 may be a semiconductor optical amplifier (SOA) or an optically pumped doped crystalline or ceramic or glass amplifier.

Figure 5A:
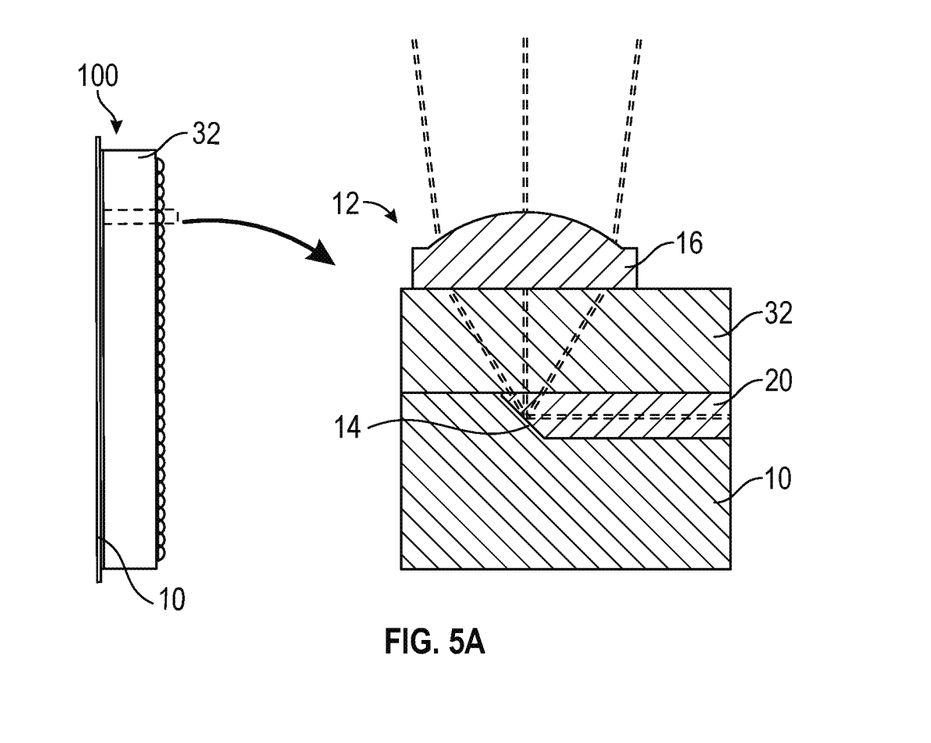
FIG. 5A is an exemplary partial cross-sectional view of the optical cell of FIG. 4, according to some embodiments of the present disclosure.
Figure 5B:
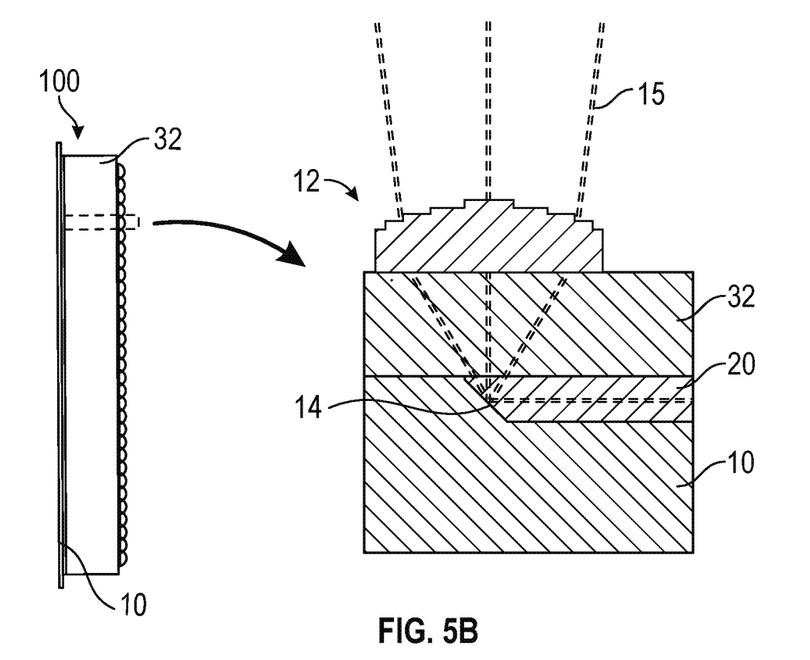
FIG. 5B is an exemplary partial cross-sectional view of the optical cell of FIG. 4, according to some embodiments of the present disclosure.
Figure 5C:
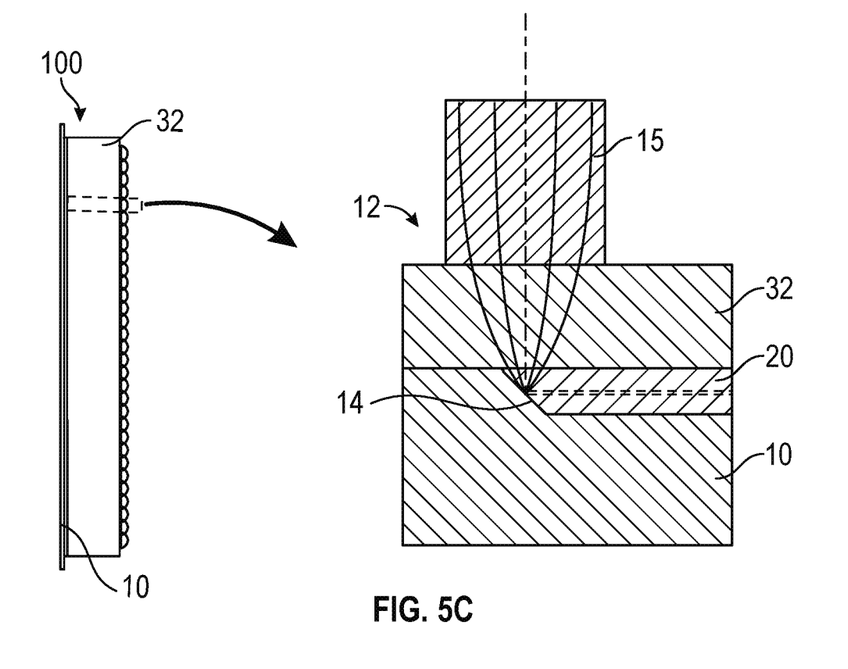
FIG. 5C is an exemplary partial cross-sectional view of the optical cell of FIG. 4, according to some embodiments of the present disclosure.

FIG. 5A is an exemplary partial cross-sectional view of the optical cell of FIG. 4, according to some embodiments of the present disclosure. FIG. 5B is an exemplary partial cross-sectional view of the optical cell of FIG. 4, according to some embodiments of the present disclosure. FIG. 5C is an exemplary partial cross-sectional view of the optical cell of FIG. 4, according to some embodiments of the present disclosure. As briefly described above, each of the focusing optical elements 16 may be a micro-lens, a lithographically defined lens, a gradient-index lens, a holographically formed lens, a refractive lens, diffractive optics, or a grating coupler. FIG. 5A depicts a configuration in which the focusing optical element 16 is a micro-lens. In these embodiments, the micro-lens may be fabricated on the substrate 32, for example, using ink-jet printing or laser direct writing in order to produce a spherical micro-lens. FIG. 5B depicts a configuration in which the focusing optical element 16 is a lithographically defined lens. In these embodiments, each focusing optical element 16 may be fabricated on the substrate 32 by etching multiple layers on top of each other to produce a roughly spherical lens. Lithographically forming the focusing optical elements 16 on the substrate 32 is advantageous in that the focusing optical elements 16 can be created in extremely small patterns (for example sizes in the magnitude of 10 µm). Further, since lithographic formation of the focusing optical elements 16 on the substrate 32 affords exact control over the shape and size of the focusing optical elements, the focusing optical elements may be fabricated on the entire substrate 32 cost-effectively. FIG. 5C depicts a configuration in which the focusing optical element 16 is a gradient-index (GRIN) lens.

Figure 6:
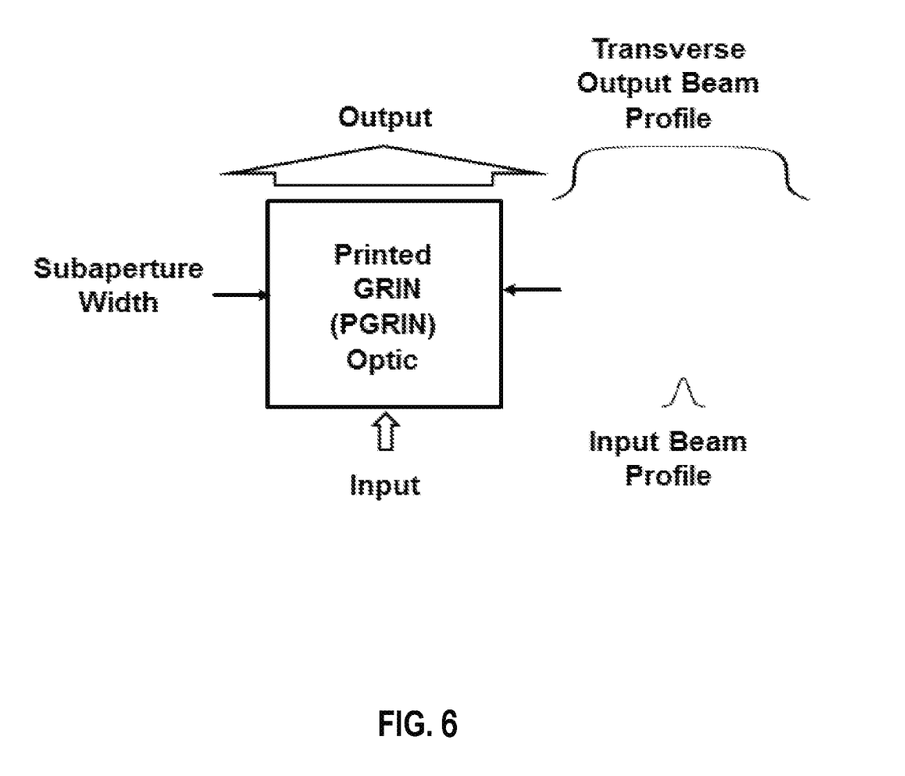
FIG. 6 is a cross-sectional view of a focusing element incorporating mode conversion using printed GRIN technology.

FIG. 6 is a cross-sectional view of a focusing element incorporating mode conversion using printed GRIN technology. Using closely spaced conventional lens elements may, in transmission, produce an intensity profile across the full aperture that is not uniform. This results from the transverse mode profile exiting waveguides being non-uniform, frequently having an approximately Gaussian shape. As this shape propagates to the lens element the Gaussian shape is retained. If the construction of the sub-aperture array is such that the mode is smaller than the subaperture then there will be non-uniformities in intensity across the array. If the mode is made much larger than the subaperture to minimize intensity variations then there will be losses associated with clipping of the mode. One method to avoid this problem is to fabricate a mode converter that converts the Gaussian mode near the waveguide exit (input transverse mode) to a top-hat or super-Gaussian shape at the focusing element plane (output transverse mode). This produces a much more uniform intensity profile across the array while not incurring high losses. This approach can be implemented as illustrated in FIG. 6. Here the focusing element is fabricated using printed-GRIN technology, such as available from Voxel, Inc., which enables fabrication of largely arbitrary refractive index profiles in three dimensions. This in turn enables fabrication of mode converters that transforms a small Gaussian input beam to a nearly flat-topped beam at the output that approximately fills the subaperture and optimizes efficiency.

Figure 7:
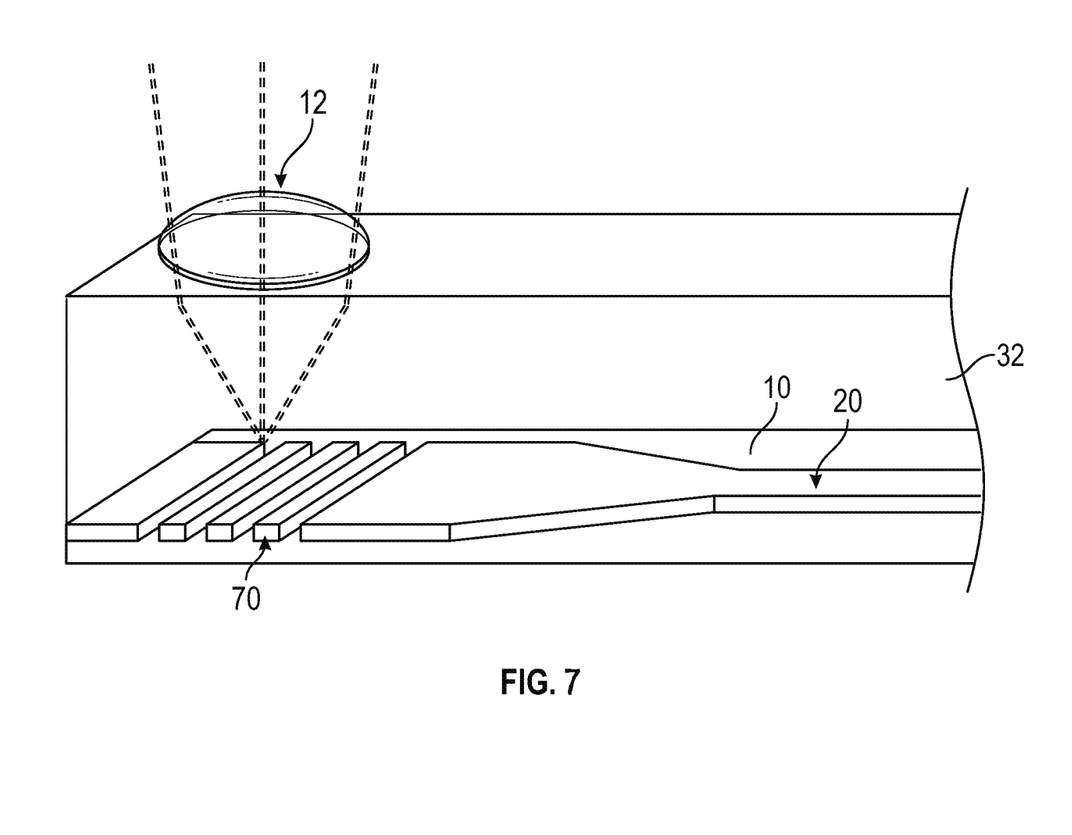
FIG. 7 is a perspective view illustrating light incident on one of the optical cells of the multi-aperture optical system of FIG. 2, according to some embodiments of the present disclosure.

FIG. 7 is a perspective view illustrating light incident on one of the optical cells of the multi-aperture optical system of FIG. 2, according to some embodiments of the present disclosure. As illustrated in FIG. 6, the folding element may be a grating coupler 70. In these embodiments, the grating coupler 70 may be formed directly in the PIC. Grating couplers are commonly used to efficiently couple light between free-space or optical fibers and optical waveguides. Light propagated in a waveguide 20 transmits into the grating coupler 70 and is diffracted out at nearly normal incidence to the waveguide plane. Very high efficiency devices have been demonstrated, such as >90% coupling efficiency from waveguides to single-mode fibers. Advantages of fiber couplers over fold mirrors include simple fabrication as well as enabling tailoring of the emitted beam diameter to meet specific needs. In the case of mirrors the beam diameter is determined by the native waveguide mode, which may be only a few hundred nm in diameter. This means that the beam diverges rapidly and makes the spacing to the lens very sensitive to manufacturing and positioning errors. Grating couplers allow creation of larger modes, such as several micrometers in diameter. This reduces the focusing tolerances by a large factor, such as a factor of ten or more.

Methods and systems of the present disclosure can be utilized to provide an array of optical cells 12 that are monolithically fabricated on a PIC 10 to inject light into the PIC 10 without the use of optical fibers as a waveguide. In accordance with some embodiments, the optical cells 12 each include a focusing optical element 16 which is optically coupled to a folding element 14 embedded in the PIC 10 to reflect the injected light at substantially right angles. In other embodiments however, as discussed above where grating couplers are used to couple light between free-space the optical waveguides, the injected light may be reflected at angles ranging between 75 to 80 degrees. In accordance with some embodiments, a method of manufacturing a multi-aperture optical system 100 may include providing a PIC 10 and monolithically fabricating a plurality of optical cells 12 on the PIC 10, where each optical cell 12 includes a folding element 14, a focusing optical element 16, a phase shifter 18, and a waveguide 20 coupled to the phase shifter 18. Monolithically fabricating the plurality of optical cells 12 on the PIC 10 may include, for each optical cell 12, integrating a folding element 14 into the PIC 10, embedding the phase shifter 18 in the PIC 10, fabricating the waveguide 20 on the PIC 10, coupling the optical fiber-free waveguide to the phase shifter 18, and lithographically forming the focusing optical element 16 on a spacer substrate 32 coupled to the PIC 10 above the folding element 14.

The method may further include fabricating a beam combiner 22 and a photodetector 26 on the PIC 10. The photodetector 26 may be coupled to the beam combiner 22, and the beam combiner 22 may be coupled to each phase shifter 18. The method may further include coupling the controller 30 to the photodetector 26 and each phase shifter 18 to control phase shifting of each phase shifter 18 based on a signal output from the photodetector 26. The PIC 10, the spacer substrate 32, the plurality of optical cells 12, the beam combiner 22, and the photodetector 26 are integrated as a single monolithically formed optical head. In particular, the focusing optical elements 16 may be lithographically formed on a first side of the substrate 32, the folding elements, the phase shifters, the waveguides, the beam combiner, and the photodetector may be lithographically formed on the PIC 10, and the PIC 10 may be coupled to a second side of the substrate 32 to form a single monolithic structure.

In accordance with some embodiments, the method may further include positioning the plurality of optical cells 12 in a one dimensional or two dimensional array in a single plane. The plurality of optical cells 12 may be placed in a single plane, and the substrate and each of the focusing elements may form a first layer, and each of the folding elements, waveguides, and phase shifters, and the beam combiner may form a second layer.

Accordingly, the methods of manufacturing yield a monolithic, pre-aligned and optical fiber-free multi-aperture optical system which eliminates the tedious process of manual alignment of separate focusing optical elements and optical fiber waveguides. Because optical fibers are traditionally extremely sensitive to vibration, FSOC systems which employ optical fibers for example in the form of waveguides, are generally unstable and difficult to employ on moving platforms. Further, FSOC systems which employ optical fibers may generally be susceptible to failure upon exposure to a certain degree of temperature change. In contrast, the methods and systems of the various embodiments described herein provide an FSOC system with improved thermal stability and jitter resistance, as compared to conventional FSOC systems. Additionally, alternative FSOC systems such as those described in U.S. patent application Ser. No. 15/217,833 employ a mechanical array of lenslets coupled into single-mode optical fiber, thereby necessitating performance of meticulous single micron alignment of separate focusing optical elements and optical fiber waveguides. In contrast, the monolithically formed multi-aperture optical system of the various embodiments described herein may be fabricated using lithographically defined chips, thereby eliminating the need for high precision alignment of the individual components, and drastically reducing manufacturing costs.

The preceding description has discussed use of a multi-aperture optical system 100 for FSOC. In accordance with some embodiments, the multi-aperture optical system 100 described herein may be applied to or used in conjunction with coherent LIDAR systems. As can be appreciated, coherent LIDAR systems typically incorporate similar functional elements as those used with FSOC. Consequently, the same technology may be used to fabricate coherent LIDAR systems. Various aspects of the present disclosure enable transmitting of a beam of light in a controlled angular direction. Such capability is desired for additional applications, for example including but not limited to optical illuminators, where light is directed to a remote area, and optical designators, where light is directed to a remote area and the intensity of the light is varied according to a pre-determined temporal code.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the disclosure. The word exemplary is used to mean serving as an example or illustration. To the extent that the term include(s), have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 11, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A multi-aperture optical system, comprising:
    a photonic integrated circuit;
    a spacer substrate coupled to the photonic integrated circuit;
    a plurality of optical cells, each optical cell including:
        a focusing optical element formed on the spacer substrate and configured to receive a light incident on the optical cell, and focus the light through the photonic integrated circuit and onto a folding element the folding element being integrated into the photonic integrated circuit to couple light incident on the optical cell into a waveguide, wherein:
        the waveguide is integrated into the photonic integrated circuit, coupled to a phase shifter, and configured to transport the light reflected by the folding element through a phase shifter, and
        the phase shifter is coupled to the focusing optical element, and configured to shift a phase of an optical signal received by the focusing optical element;
    a beam combiner coupled to the phase shifters, and configured to combine light output from the phase shifters; and
    a photodetector coupled to the beam combiner to receive the combined light output from the beam combiner and output a corresponding signal,
    wherein the photonic integrated circuit, the spacer substrate, the plurality of optical cells, the beam combiner, and the photodetector are integrated as a single monolithically formed optical head.

2. The multi-aperture optical system of claim 1, further comprising a controller coupled to the photodetector and the phase shifters to control phase shifting of each phase shifter based on the signal output from the photodetector.

3. The multi-aperture optical system of claim 1, wherein the waveguide comprises a waveguide free of optical fibers.

4. The multi-aperture optical system of claim 1, wherein the plurality of optical cells, the beam combiner, and the photodetector are lithographically formed on the photonic integrated circuit.

5. The multi-aperture optical system of claim 1, wherein the focusing optical element is selected from the group consisting of a micro-lens, a lithographically defined lens, a gradient-index lens, a holographically formed lens, a refractive lens, diffractive optics, and a meta materials lens.

6. The multi-aperture optical system of claim 1, wherein the focusing optical element converts an input transverse mode shape to a different output transverse mode shape.

7. The focusing optical element of claim 6, wherein the input transverse mode shape is substantially Gaussian and the output mode shape is substantially super-Gaussian.

8. The multi-aperture optical system of claim 1, wherein the focusing optical element has a diameter raging from about 10 µm to about 10 mm.

9. The multi-aperture optical system of claim 1, wherein the folding element comprises a micro-mirror or a grating coupler.

10. The multi-aperture optical system of claim 1, wherein the folding element is configured to fold the light incident from the focusing optical element by a value ranging between about 75 degrees and 90 degrees.

11. The multi-aperture optical system of claim 1, wherein the waveguide is lithographically formed on or in the photonic integrated circuit.

12. The multi-aperture optical system of claim 1, wherein the waveguide is formed on the photonic integrated circuit using ultrafast laser inscription (ULI).

13. The multi-aperture optical system of claim 1, wherein the phase shifter is selected from the group consisting of a thermal phase shifter, a semiconductor phase shifter, or an electro-optic phase shifter.

14. The multi-aperture optical system of claim 1, wherein the plurality of optical cells are positioned in a one dimensional or two dimensional array in a single plane.

15. The multi-aperture optical system of claim 1, wherein:
    the plurality of optical cells are placed in a substantially single plane; and
    the spacer substrate and each of the focusing optical elements form a first layer, and each of the folding elements, waveguides, and phase shifters, and the beam combiner form a second layer.

16. The multi-aperture optical system of claim 1, wherein each optical cell further comprises an optical amplifier disposed in series with the phase shifter.

17. The multi-aperture optical system of claim 16, wherein the optical amplifier comprises a semiconductor optical amplifier (SOA) or an optically pumped doped crystalline or ceramic or glass.

18. The multi-aperture optical system of claim 1, further comprising a coarse beam steering element positioned in front of the plurality of optical cells.

19. The multi-aperture optical system of claim 18, wherein the coarse beam steering element comprises a liquid crystal beam steering device or a mechanically steered mirror.

20. A method of manufacturing a multi-aperture optical system, the method comprising:
    fabricating a plurality of optical cells onto a photonic integrated circuit, each optical cell including a folding element, a focusing optical element, a phase shifter, and a waveguide coupled to the phase shifter, the fabricating comprising, for each optical cell:
        integrating a folding element into the photonic integrated circuit;
        embedding the phase shifter in the photonic integrated circuit;

fabricating the waveguide on or in the photonic integrated circuit and coupling the waveguide to the phase shifter; and fabricating the focusing optical element on a spacer substrate coupled to the photonic integrated circuit above the folding element; and fabricating a beam combiner and a photodetector on the photonic integrated circuit, the photodetector being coupled to the beam combiner and the beam combiner coupled to each phase shifter, wherein the photonic integrated circuit, the spacer substrate, the plurality of optical cells, the beam combiner, and the photodetector are integrated as a single monolithically formed optical head.

21. The method of claim 20, further comprising coupling a controller to the photodetector and to each phase shifter to control phase shifts of each phase shifter based on a signal output from the photodetector.

22. The method of claim 20, further comprising fabricating an optical amplifier on the photonic integrated circuit in series with each phase shifter.

23. The method of claim 20, wherein the plurality of optical cells, the beam combiner, and the photodetector are lithographically formed on the photonic integrated circuit.

* * * * *